United States Patent
Herman et al.

(10) Patent No.: US 11,166,003 B1
(45) Date of Patent: Nov. 2, 2021

(54) DYNAMIC VIBRATION SENSOR OPTICS DISTORTION PREDICTION

(71) Applicant: Ford Global Technologies, LLC, Dearborn, MI (US)

(72) Inventors: David Michael Herman, Oak Park, MI (US); Aaron Lesky, Ypsilanti, MI (US); Ronald Beras, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/863,124

(22) Filed: Apr. 30, 2020

(51) Int. Cl.
| | |
|---|---|
| H04N 13/128 | (2018.01) |
| H04N 5/225 | (2006.01) |
| G06T 5/00 | (2006.01) |
| G06T 5/50 | (2006.01) |
| B60R 11/04 | (2006.01) |
| B60R 11/00 | (2006.01) |
| H04N 13/00 | (2018.01) |

(52) U.S. Cl.
CPC ............ *H04N 13/128* (2018.05); *B60R 11/04* (2013.01); *G06T 5/006* (2013.01); *G06T 5/50* (2013.01); *H04N 5/2252* (2013.01); *B60R 2011/004* (2013.01); *G06T 2207/10012* (2013.01); *G06T 2207/30252* (2013.01); *H04N 2013/0081* (2013.01); *H04N 2013/0096* (2013.01)

(58) Field of Classification Search
CPC ........ G01C 21/32; G01C 11/04; G01C 21/20; G01C 21/26; G01C 21/3822; G01C 11/02; G01C 15/002; G06T 2207/30256; B60R 21/01516; B60R 21/0152; B60R 21/0153; B60R 21/01542; B60R 21/01534; B60R 21/01536; B60R 16/037; B60R 2001/1223
USPC .......................................................... 348/47
See application file for complete search history.

(56) References Cited

U.S. PATENT DOCUMENTS

| | | | |
|---|---|---|---|
| 8,212,880 B2 | 7/2012 | Anderson et al. | |
| 2010/0266161 A1* | 10/2010 | Kmiecik | G01C 21/3822 |
| | | | 382/103 |
| 2011/0032357 A1* | 2/2011 | Kitaura | G06T 5/006 |
| | | | 348/148 |
| 2019/0273870 A1 | 9/2019 | Wang et al. | |
| 2020/0372315 A1* | 11/2020 | Jablonski | G06K 19/0723 |

FOREIGN PATENT DOCUMENTS

| | | |
|---|---|---|
| EP | 2530651 B1 | 5/2019 |
| JP | 2005182529 A * | 7/2005 |

* cited by examiner

*Primary Examiner* — Masum Billah
(74) *Attorney, Agent, or Firm* — Frank A. MacKenzie; Bejin Bieneman PLC (57) ABSTRACT

The present disclosure discloses a system and a method for mitigating image distortion. In an example implementation, the system and the method can receive vehicle state data and vehicle inertial measurement data; generate an image distortion prediction indicative of image distortion within an image captured by the image capture assembly based on the vehicle state data and the vehicle inertial measurement data; and at least one of correct or mitigate the image distortion based on the image distortion prediction.

17 Claims, 5 Drawing Sheets

DYNAMIC VIBRATION SENSOR OPTICS DISTORTION PREDICTION

BACKGROUND

Autonomous vehicles typically include various sensors that provide information regarding the surrounding environment. In some examples, these autonomous vehicles can include camera sensors, radar sensors, and lidar sensors.

In some instances, the camera sensors may incorporate stereoscopic vision, or multi-camera imaging, involves two or more cameras having overlapping fields of view. By viewing the same object or objects from different viewing angles, the observed disparity between the positions of objects in respective ones of the multiple views provides a basis for computing distances to those objects. Some vehicle systems may use stereoscopic vision imaging for the purposes of monitoring the surrounding environment.

DETAILED DESCRIPTION

A system includes a computer including a processor and a memory. The memory includes instructions such that the processor is programmed to receive vehicle state data and vehicle inertial measurement data; generate an image distortion prediction indicative of image distortion within an image captured by the image capture assembly based on the vehicle state data and the vehicle inertial measurement data; and at least one of correct or mitigate image distortion within the image based on the image distortion prediction.

In other features, the processor is further programmed to actuate a vehicle based on the image distortion prediction.

In other features, the image distortion prediction includes at least one of a distortion type or a distortion magnitude.

In other features, the at least one of the distortion type or the distortion magnitude comprises at least one of an image translation, an image rotation, or an image distortion error.

In other features, the processor is further programmed to mitigate the image distortion based on the image distortion prediction by accessing a lookup table based on the at least one of the distortion type or the distortion magnitude and applying an image correction technique corresponding to the at least one of the distortion type or the distortion magnitude.

In other features, the processor is further programmed to update a vehicle routing algorithm based on the image distortion prediction.

In other features, the processor is further programmed to receive strain data associated with an image capture assembly, wherein the strain data is indicative of strain on the image capture assembly; and generate an image distortion prediction indicative of image distortion within an image captured by the image capture assembly based on the vehicle state data, the vehicle inertial measurement data, and the strain data.

In other features, the system includes the image capture assembly disposed over a roof of a vehicle.

In other features, the image capture assembly comprises a housing including a camera.

In other features, the system includes a sensor disposed within the housing.

In other features, the sensor measures at least one of the strain data indicative of strain on the image capture assembly or inertial measurement data of the image capture assembly.

In other features, the camera comprises a stereoscopic camera, and the sensor is attached to a lens assembly of at least one of a first camera or a second camera of the stereoscopic camera.

In other features, the processor is further programmed to modify an image filter parameter of an image perception algorithm based on the image distortion prediction.

In other features, the processor is further programmed to modify a vehicle speed and a vehicle course based on the image distortion prediction.

A method includes receiving vehicle state data and vehicle inertial measurement data; generating an image distortion prediction indicative of image distortion within an image captured by the image capture assembly based on the vehicle state data and the vehicle inertial measurement data; and at least one of correcting or mitigating image distortion within the image based on the image distortion prediction.

In other features, the method further includes actuating a vehicle based on the image distortion prediction.

In other features, the image distortion prediction includes at least one of a distortion type or a distortion magnitude.

In other features, the at least one of the distortion type or the distortion magnitude comprises at least one of an image translation, an image rotation, or an image distortion error.

In other features, the mitigating the image distortion based on the image distortion prediction includes accessing a lookup table based on the at least one of the distortion type or the distortion magnitude and applying an image correction technique corresponding to the at least one of the distortion type or the distortion magnitude.

In other features, the method further includes receiving strain data associated with an image capture assembly, wherein the strain data is indicative of force on the image capture assembly; and generating an image distortion prediction indicative of image distortion within an image captured by the image capture assembly based on the vehicle state data, the vehicle inertial measurement data, and the strain data.

Sensors, e.g. cameras, lidars, etc., often incorporate optical elements, e.g. lenses, which act to improve the path of light to or from a sensor or sub-component of a sensor, e.g. photodiode, emitter, sensor array, etc. Such a sensor may often be mounted onto a vehicle and operate while the vehicle undergoes vibrational loading. Stable sensor data even under varying vibrational loading is essential for use in automated and semi-automated driving systems. Furthermore, multiple sensors output may be compared in a sensor fusion process, stereoscopic vision algorithm, or some other process.

Autonomous vehicles can employ perception algorithms, or agents, to perceive the environment around the vehicle.

These vehicles can employ multiple sensors for perceiving aspects of the surrounding environment. The perception algorithms use the sensor data to determine whether one or more vehicle actions should be modified based on the sensor data. For example, the perception algorithms may update a routing algorithm such that the vehicle alters course based on a sensed object within the environment. The present disclosure discloses a system and a method for mitigating image distortion associated with an image capture assembly of vehicle.

Figure 1:
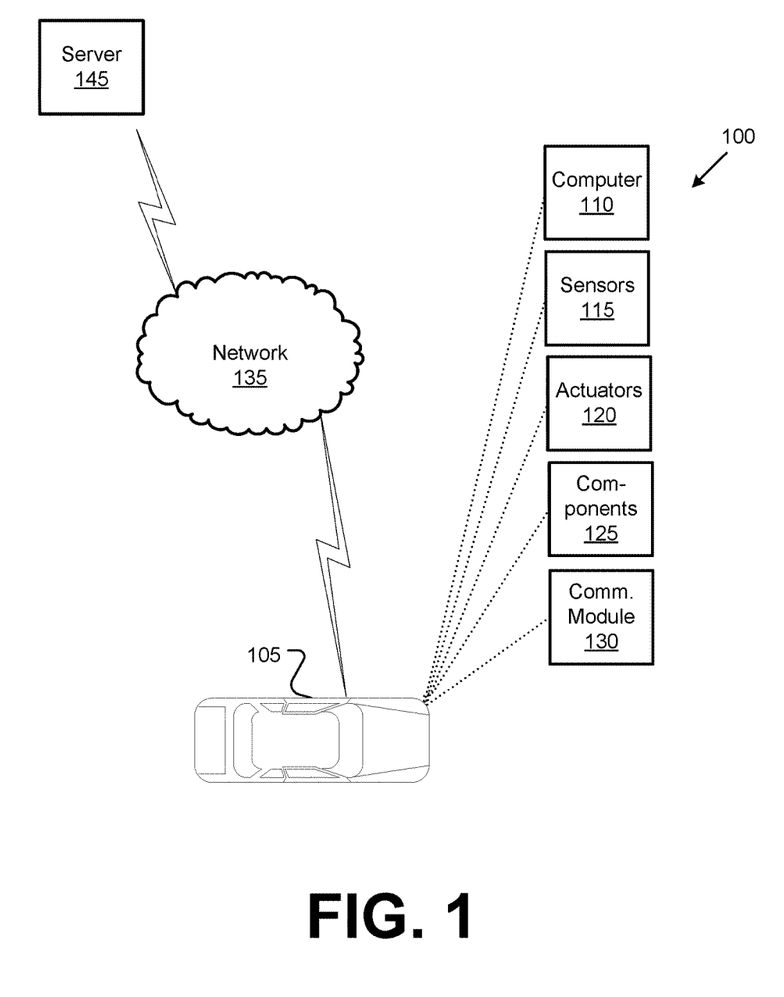
FIG. 1 is a diagram of an example vehicle system in accordance with an example implementation of the present disclosure.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105. The vehicle sensors 115 may also include inertial measurement units (IMUs) that measure force, angular rate, and/or an orientation associated with the vehicle 105.

Within the present disclosure, the vehicle sensors 115 may comprise active sensors and/or passive sensors. Active sensors, such as lidar and radar sensors, project energy into a surrounding environment and use measured energy reflections to interpret and/or classify objects within the environment. Passive sensors, such as cameras, do not project energy for the purposes of interpretation and/or classification. Each type of sensor may employ optical elements for the purposes of steering electromagnetic radiation, e.g., light, for transmission and/or receiving purposes. In some instances, errors or changes in optics may affect the perceived image and/or point cloud received.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
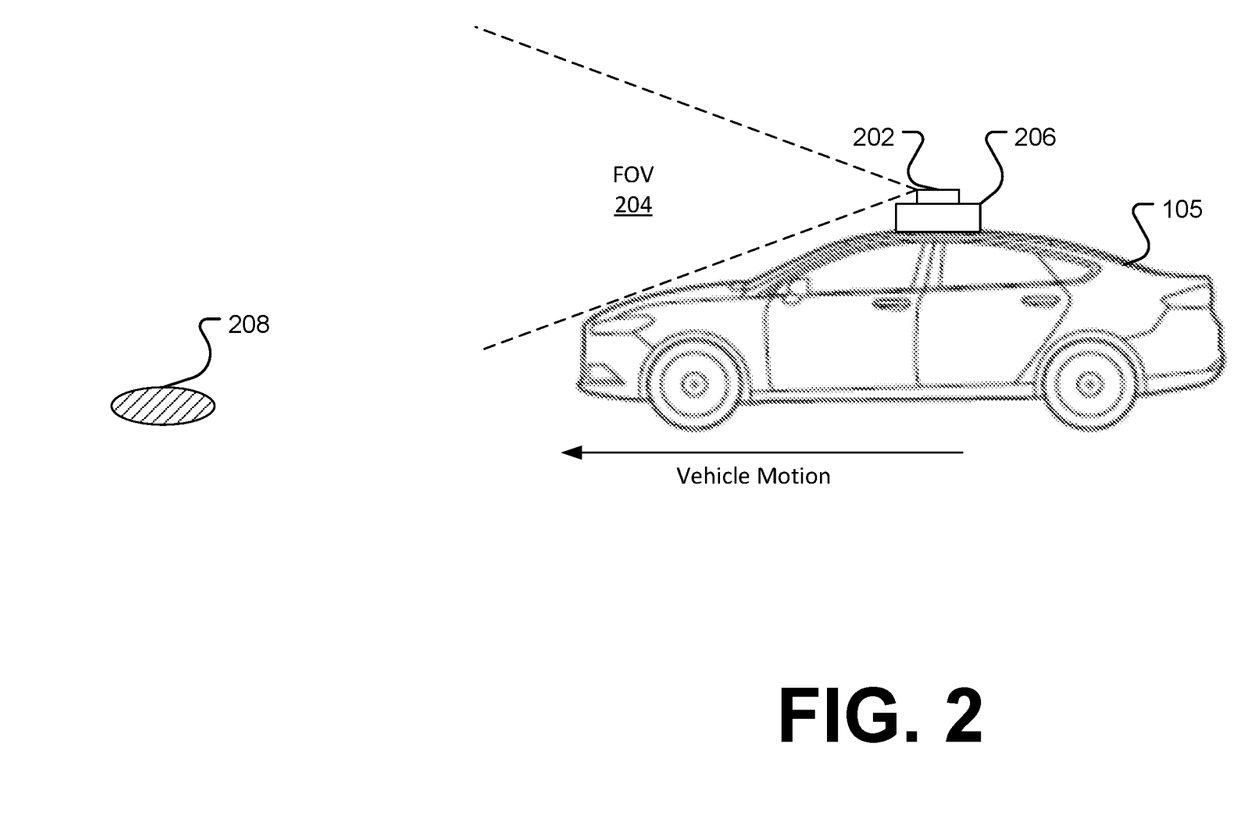
FIG. 2 is a diagram of an example vehicle including an image capture assembly in accordance with an example implementation of the present disclosure.

FIG. 2 illustrates an example image capture assembly 202 attached to the vehicle 105. As shown, the image capture assembly 202 may be positioned over a roof of the vehicle 105. However, the image capture assembly 202 may be located about the vehicle 105 in other implementations. As explained in greater detail below, the image capture assembly 202 captures images within a field of view (FOV) 204 about an environment of the vehicle 105. The image capture assembly 202 can include a housing 204 that houses, e.g., contains, the various components of the sensor apparatus. In one or more implementations, the housing 204 may comprise a fiber composite structure, a space frame structure, or the like.

As the vehicle 105 traverses a path, e.g., roadway, the image capture assembly 202 captures images of an environment. For instance, the image capture assembly 202 may capture images including depictions of possible objects of interest within the path of the vehicle, such as a pothole 208. The images are provided to the computer 105 such that the computer 105 can classify objects within the image and actuate the vehicle 105 in response to the classification.

Figure 3A:
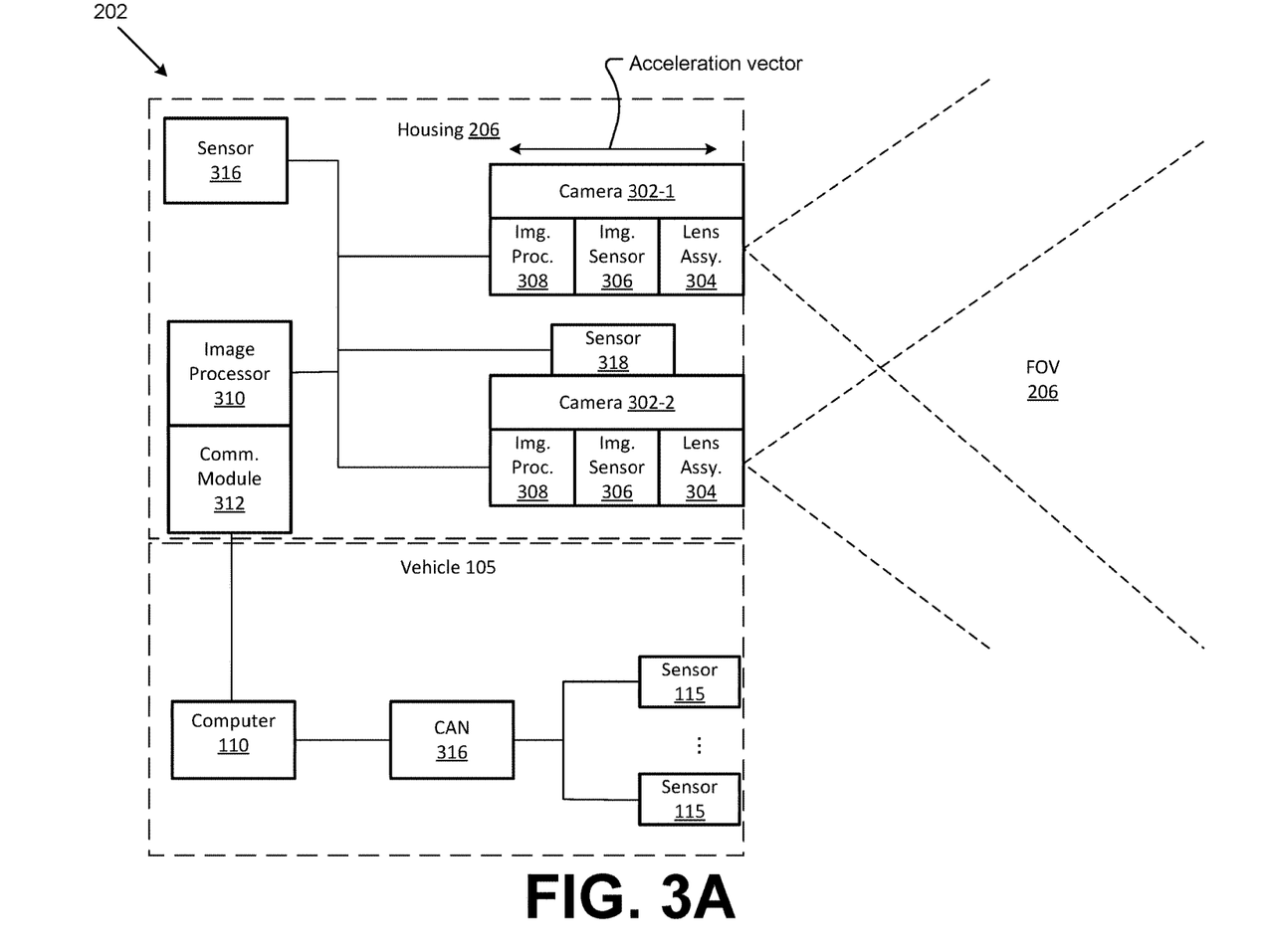
FIG. 3A is a block diagram of an example image capture assembly in accordance with an example implementation of the present disclosure.

FIG. 3A is a block diagram illustrating an example image capture assembly 202 according to an example implementation. The sensor apparatus 202 is communicatively connected to the computer 110 and includes one or more cameras 302-1, 302-2. As a matter of convenience, only one camera is illustrated. However, it is understood that the image capture assembly 202 may include additional cameras in other implementations. In one or more implementations, the image capture assembly 202 may include additional sensors, such as lidar sensors, that may utilize optics in both light transmission and light receival. Each sensor's output may be compared and/or fused with one another before or after object detection. An example of low level sensor fusion before object detection is multi-view imaging. For instance, the vehicle system 100 can use various sensor fusion techniques to compare and/or fuse the sensor output with one another. For instance, the sensor fusion techniques may include, but are not limited to, competitive sensor fusion techniques, complementary sensor fusion techniques, and/or cooperative sensor fusion techniques.

As an example, each camera 302-1, 302-2 provides multi-view imaging capability, e.g., stereoscopic imaging capability. For instance, the cameras 302-1, 302-2 are operated as a stereo camera pair. Each camera 302-1, 302-2 includes a lens assembly 304 including one or more lenses, an image sensor 306 that is placed in optical alignment with the lens assembly 304, and an image processor 308, which may be a pre-processor or other processing circuit configured to operate the image sensor 306, provide read-out of image sensor data, control exposure times, etc.

In another example, a lidar sensor projects electromagnetic radiation into a FOV of the lidar sensor and measures the reflected electromagnetic radiation. Processors associated with the lidar sensor use the measured return times and wavelengths to generate a three-dimensional representation of one or more objects within the FOV. Similarly, lidar sensors use optics for the purposes of focusing and/or receiving electromagnetic radiation.

The image capture assembly 202 also includes an image processor 310, which may comprise one or more microprocessor-based, DSP-based, ASIC-based, and/or FPGA-based circuits. In an implementation, the image processor 310 comprises digital processing circuitry that performs stereo image correlation processing for stereo images as captured by the camera 302-1, 302-2. The image processor 310 can perform multi-view image processing, such as generating depth maps and determining ranges to objects within the imaged scene.

In an example implementation, the image processor receives successive images, also referred to as "frames," from each of the camera 302-1, 302-2. Here, a "frame" or "image" comprises the image data, e.g., pixel data, from the image sensor for a given image capture. For example, the image processor 310 receives a pair of images, one from the first camera 302-1 and one from the camera 302-1, during each one in a succession of capture intervals. The frame rate or capture rate determines the rate at which new images are captured by the camera 302-1, 302-2.

The image processor 310 performs three-dimensional (3D) ranging for the captured images, based on performing correlation processing across corresponding image pairs from the cameras 302-1, 302-2. The cameras 302-1, 302-2 may be disposed along a horizontal line, e.g. epipolar geometry, at some separation distance, for operation as left-image and right-image cameras. The "disparity" or displacement seen between the pixel position(s) in the left image and the right image, for the same imaged pixel of an object or feature, provides the basis for determining 3D ranging information, as is understood by those of ordinary skill in the art. For instance, in some implementations, grid and/or global search algorithms may be improved with better camera image frame alignment. The horizontal distance between the cameras 302-1, 302-2 may be referred to as a "baseline."

In one or more embodiments, the image processor 310 includes or is associated with a storage device. The storage device will be understood as comprising a type of computer-readable medium—e.g., FLASH memory or EEPROM—that provides non-transitory storage for a computer program. The image processor 310 is adapted to carry out the corresponding processing taught herein based on its execution of computer program instructions.

The image capture assembly 202 further includes a communication module 312 that communicatively connects the computer 110 to the image capture assembly 202, thereby allowing the image capture assembly 202 to provide image data and/or derived object detection data to the computer 110, and allowing the computer 110 to provide the image capture assembly 202 with computer-readable instructions. The communication module 312 could include one or more mechanisms by which the image capture assembly 202 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communication module 312 include cellular, Bluetooth®, IEEE 802.11, dedicated short range communications (DSRC), and/or wide area networks (WAN), including the Internet, providing data communication services.

During operation, the image processor 310 and/or the computer 110 processor estimates misalignments, e.g., mechanical misalignments, in and/or between the cameras 302-1, 302-2, which is described in greater detail below. The misalignments may be caused by vehicle acceleration, the vehicle 105 experiencing a force inducing event, and the like. As shown, one or more sensors 115 are communicatively connected to the computer 110 via a Controller Area Network (CAN) bus 320 such that the sensors 115 can provide vehicle state data to the computer 110. For instance, the vehicle state data can include, but is not limited to, vehicle acceleration, vehicle speed, pedal position, engine revolutions-per-minute (RPM), vehicle inertial measurement data, and the like.

As illustrated in FIG. 3A, the image capture assembly 202 also includes a sensor 316. In an example implementation, the sensor 316 comprises a strain gauge that measures strain on an object. The strain gauge can be a suitable strain sensor or related sensor types that measure strain on a known geometry. For instance, the strain gauge may include, but is not limited, optical fiber strain gauges, mechanical strain gauges, or electrical strain gauges. The sensor 316 may be mounted to the housing 204 to measure the strain on the housing 204 and/or a body structure of the vehicle 105. In an implementation, the image capture assembly 202 may also include a sensor 318 that is attached to one or both of the cameras 302-1, 302-2 and/or camera optics, e.g., lens assembly. For instance, the sensor 318 may be attached to the lens assembly 304 to measure forces on the lens assembly 304. In an example implementation, the sensor 318 may comprise an inertial measurement unit (IMU) that measures an acceleration, angular rate, and/or an orientation associated with the cameras 302-1, 302-2. In another example implementation, the sensor 318 may comprise a suitable strain gauge that measures strain on the cameras 302-1, 302-2. While only a single sensor 316 and a single sensor 318 are illustrated, it is understood that the image capture assembly 202 can employ any number of sensors 318.

The image processor 310 and/or the processor of the computer 110 receive measurement data from the sensors 115, 316, 318 and estimate lens assembly 304 accelerations and/or forces to generate a displacement and stress prediction indicative of the displacement and stress on the lens assembly 304. The image processor 310 and/or the computer 110 processor can generate the displacement and stress prediction based on suitable finite element analysis. For instance, finite element analysis may use lens assembly geometry, boundary conditions, material properties, inertial measurement data, vehicle state data, and/or strain data associated with the vehicle 105 and/or the image capture assembly 202 to provide a displacement and stress prediction through empirical testing and/or analysis. Furthermore, discrete time steps of the finite element analysis may further be interpolated or extrapolated to the corresponding time frame of the camera's image capture, inclusive of the rolling shutter frame by frame exposure time. Lastly, the finite element model's prediction may be incorporated into a trained neural network or other algorithm to improve and enable real time prediction of the state of the lens assembly.

Based on the prediction, the image processor 310 and/or the computer 110 processor generate a distortion prediction indicative of a distortion of an image received by the cameras 302-1, 302-2.

In an implementation, the image processor 310 and/or the computer 110 processor can use a lookup table relating predicted lens displacement and stress to predicted image distortion. In another implementation, the image processor 310 and/or the computer 110 processor can use machine learning techniques to predict image distortion based on the predicted lens displacement and stress. The machine learning techniques may be trained and/or the lookup table may be programmed based on ray tracing optics simulation. The output of the ray tracing optics simulation are image distortion prediction(s). These image distortion predictions may include a distortion type and/or distortion magnitude. For instance, the distortion type and/or distortion magnitude include, but are not limited to, an image translation, an image rotation, or an image distortion error inclusive of defocus, tilt, spherical aberration, Astigmatism, comatic aberration, shift of the image plane, distortion (barrel, pincushion, mustache), Petzval field curvature, chromatic aberration, point spread function, or the like. Within the present disclosure, distortion may be defined as an optical aberration, such as a deviation from rectilinear projection, which a property of the optical systems causes light to be spread out over some region of space rather than focused to a point.

Figure 3B:
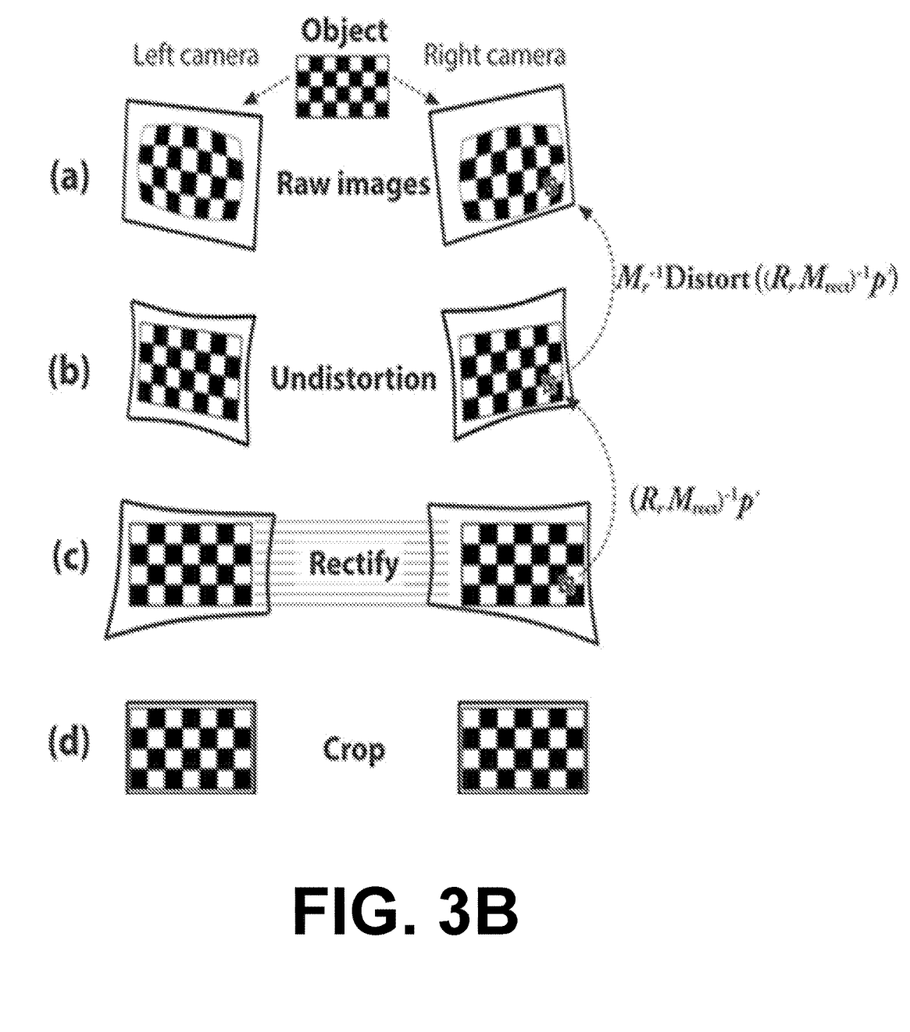
FIG. 3B is an example diagram of an object detected by the image capture assembly in which various forces on a lens assembly of the image capture assembly cause distortion of the object within the captured image.

FIG. 3B is a diagram illustrating an example object detected by a sensor assembly, such as the image capture assembly 202. As illustrated in steps (a)-(d) different impact loads cause the lens assemblies 304 to change differently with respect to one another. For instance, FIG. 3B-a illustrates barrel distortion of varying magnitudes based on the respective lens assembly 304. As described herein, the image processor 310 and/or the computer 110 correct or mitigate image distortion within the image based on an image distortion prediction.

In other examples, the image distortion associated with the lens assembly 304 may be computed based on empirical testing in conjunction with imaging of a calibration pattern under varying time histories of amplitude, acceleration, frequency, and the like. In some implementations, the machine learning techniques and/or the lookup table may be initialized at the server 145 and provided to the computer 110 via the network 135. However, it is understood that the machine learning techniques and/or the lookup table may be initialized at any suitable server and provided to the computer 110 via any suitable communication network.

The image processor 310 and/or the computer 110 processor uses suitable computer vision techniques for the purposes of identifying objects and/or object types within the FOV 204 of the image capture assembly 202. Suitable computer vision techniques can include, but are not limited to, computer vision algorithms or machine learning techniques used for image processing for object detection and/or object classification to allow an autonomous vehicle to navigate its environment.

In some implementations, the image processor 310 and/or the computer 110 processor correct and/or mitigate image distortion of the received image according to the distortion type and/or distortion magnitude, which results in an updated image. In some implementations, the image processor 310 and/or the computer 110 processor apply image correction for certain distortion types and/or distortion magnitudes. For instance, the image processor 310 and/or the computer 110 processor may use a lookup table relating distortion types and/or distortion magnitudes to image correction techniques and/or lidar point cloud correction techniques.

The image processor 310 and/or the computer 110 may use the following equations to correct radial distortion associated with the image:

$$x_{corrected} = x(1+k_1*r^2+k_2*r^4+k_3*r^6) \quad \text{Equation 1,}$$

$$y_{corrected} = y(1+k_1*r^2+k_2*r^4+k_3*r^6) \quad \text{Equation 2,}$$

where $x_{corrected}$ and $y_{corrected}$ represent corrected pixel locations, x and y represent undistorted pixel locations, $k_1$, $k_2$, and $k_3$ represent radial distortion coefficients of the lens assembly 304, and $r^2$ represents $x^2+y^2$.

The image processor 310 and/or the computer 110 may use the following equations to correct tangential distortion associated with the image:

$$x_{corrected} = x+[2*p_1*x*y+p_2*(r^2+2*x^2)] \quad \text{Equation 3,}$$

$$y_{corrected} = y+[p_1*(r^2+2*y^2)+2*p_2*x*y] \quad \text{Equation 4,}$$

where $x_{corrected}$ and $y_{corrected}$ represent corrected pixel locations, x and y represent undistorted pixel locations, $k_1$, $k_2$, and $k_3$ represent tangential distortion coefficients of the lens assembly 304, and $r^2$ represents $x^2+y^2$.

In some implementation in which the received image cannot be corrected based on the distortion type, distortion magnitude, a characterization of a point spread function form, and/or interactions amongst multiple distortion modes (C1*contrast+C2*resolution+C3*contrast*resolution>threshold?), the image processor 310 and/or the computer 110 processor update image perception algorithms used to navigate the vehicle 105 based on the received image(s). The variables C1, C2, and C3 can comprise coefficients that weight and/or normalize distortion metrics with respect to a predefined distortion threshold. The predefined distortion threshold may be based on statistical evaluation of camera distortion parameters relative to object detection accuracy, false positive rate, $R^2$, etc. For instance, the image processor 310 and/or the computer 110 processor can bin the received image to reduce the image size, modifying image filter parameters, e.g., Gaussian, median, or bilateral image filters, etc., or other computer vision workflow modification. The computer 110 may also initiate one or more vehicle 105 actions based on the updated image, distortion type, and/or distortion magnitude. A vehicle 105 action may include, but is not limited to, modifying vehicle 105 speed, generating an alert, modifying a vehicle 105 course, and the like.

Figure 4:
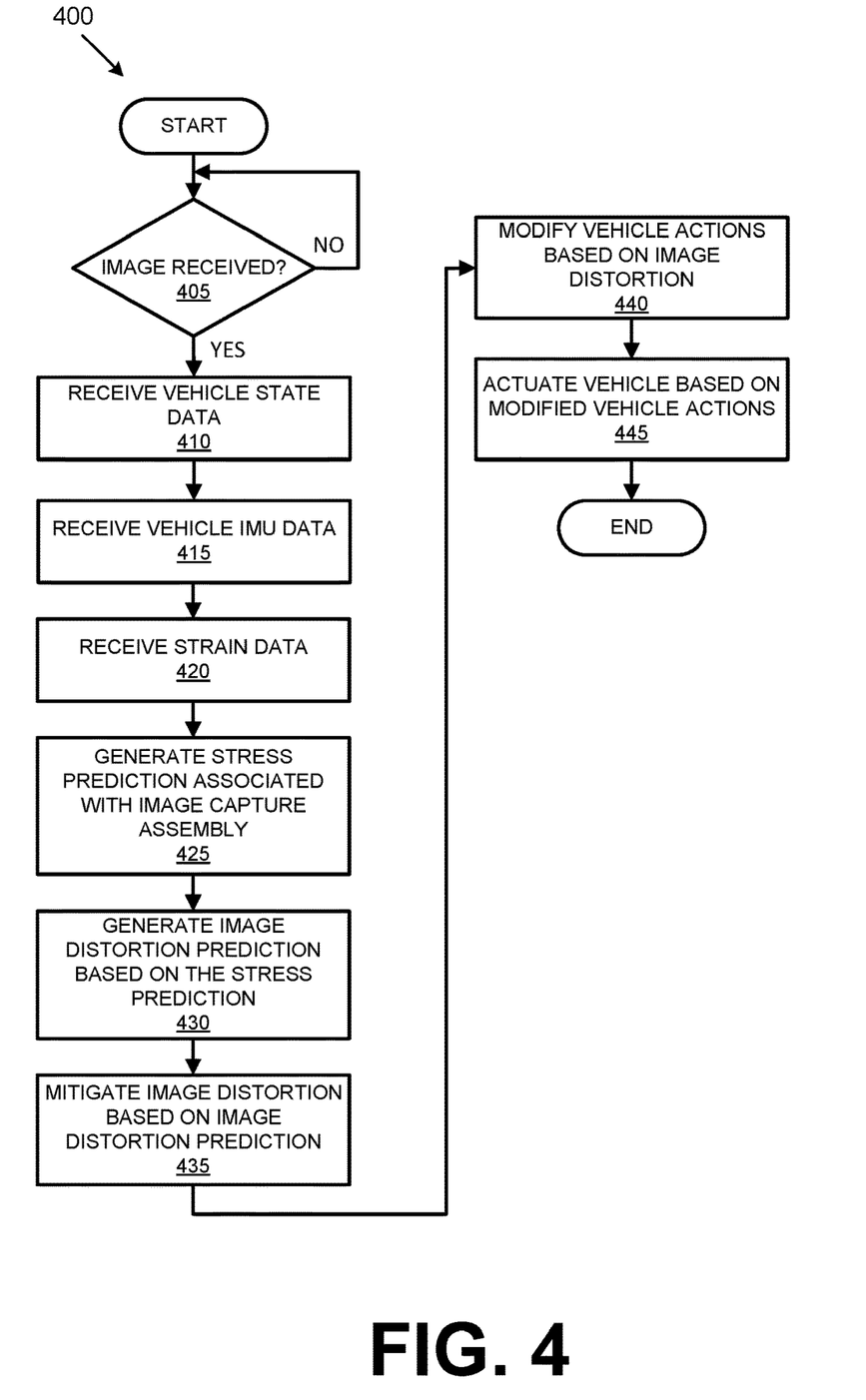
FIG. 4 is a flow diagram illustrating an example process for mitigating image distortion in accordance with an example implementation of the present disclosure.

FIG. 4 is a flowchart of an exemplary process 400 for mitigating image distortion. Blocks of the process 400 can be executed by the computer 110 or the image processor 310. The process 400 begins at block 405 in which a determination is made of whether has been received from the image capture assembly 202. If no image has been received, the process 400 returns to block 405. In an example implementation, the computer 110 may apply static distortion correction, e.g. barrel distortion correction, to the received image from the static calibration process to the dynamic loading correction prediction. Additionally or alternatively, the computer 110 may apply quasi-static distortion parameter correction to the received image. One example is temperature effects on the lens distortion that may be characterized while static and possibly incorporated into the finite element analysis (FEA) model where some plastics change mechanical response (e.g. viscoelastic mode) with temperature/loading rates which may be model as a Prony series Otherwise, at block 410 in which vehicle state data is received. Vehicle state data can include, but is not limited to, vehicle acceleration, vehicle speed, pedal position, engine revolutions-per-minute (RPM), inertial measurement data, and the like.

At block 415, inertial measurement data associated with the vehicle 105 is received. At block 420, strain data associated with the vehicle 105 and/or the image capture assembly 202 is received. At block 425, stress prediction for the image capture assembly 202, e.g., cameras 302-1, 302-2 is generated. In an example implementation, the camera assembly displacement and stress prediction is generated using finite element analysis that uses the vehicle state data, the inertial measurement data, and/or the strain data as input.

At block 430, an image distortion prediction is generated based on the stress prediction. For instance, a lookup table and/or machine learning techniques can be used to relate the stress prediction to the image distortion prediction. At block 435, image distortion associated with received image is mitigated. In an example implementation, the image processor 310 and/or the computer 110 processor can access a lookup table for image correction techniques corresponding to the distortion types and/or distortion magnitudes. In another example implementation, the image processor 310 and/or the computer 110 processor modify vehicle perception algorithms to account for the distortion types and/or distortion magnitudes.

At block 440, one or more vehicle actions are modified based on the image distortion. In an example implementation, one or more vehicle routing algorithms may be modified based on the image distortion. For instance, a vehicle routing algorithm may be updated to slow a speed of the vehicle 105 relative to its current speed. In another instance, an alert may be generated to alert an operator and/or passengers to the image distortion. At block 445, the vehicle is actuated based on the modified vehicle actions. For example, the computer 110 may cause the vehicle 105 to alter the path of the vehicle 105 according to the updated vehicle routing algorithm. In some instances, post processing techniques can be executed to validate that the process 400 is operating. For example, the post processing techniques may include comparing a street sign before and after the vehicle 105 experiences a force-inducing event, such as the vehicle 105 driving over an object or driving through a pothole. The post processing techniques may compare an image of the street sign before and after the force-inducing event to ensure the comparison of the images is within a predefined threshold, e.g., a sufficient amount of pixels representing the street sign match.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Intercal, Visual Basic, Java Script, Perl, Python, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above. Some additional examples of databases may include NoSQL and/or graph databases (GDB).

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive vehicle state data, vehicle inertial measurement data, and strain data indicative of displacement on an image capture assembly;
   generate an image distortion prediction indicative of image distortion within an image captured by the image capture assembly based on the vehicle state data, the vehicle inertial measurement data, and the strain data;
   at least one of correct or mitigate image distortion within the image based on the image distortion prediction; and
   determine whether to modify one or more vehicle actions, including at least a vehicle speed or a vehicle course, based on the image distortion prediction.

2. The system of claim 1, wherein the processor is further programmed to actuate the vehicle based on the image distortion prediction.

3. The system of claim 1, wherein the image distortion prediction includes at least one of a distortion type or a distortion magnitude.

4. The system of claim 3, wherein the at least one of the distortion type or the distortion magnitude comprises at least one of an image translation, an image rotation, or an image distortion error.

5. The system of claim 3, wherein the processor is further programmed to mitigate the image distortion based on the image distortion prediction by accessing a lookup table based on the at least one of the distortion type or the distortion magnitude and applying an image correction technique corresponding to the at least one of the distortion type or the distortion magnitude.

6. The system of claim 1, wherein the processor is further programmed to update a vehicle routing algorithm based on the image distortion prediction.

7. The system of claim 1, further comprising the image capture assembly disposed over a roof of the vehicle.

8. The system of claim 7, wherein the image capture assembly comprises a housing including a camera.

9. The system of claim 8, further comprising a sensor disposed within the housing.

10. The system of claim 9, wherein the sensor measures at least one of strain data indicative of strain on the image capture assembly or inertial measurement data of the image capture assembly.

11. The system of claim 9, wherein the camera comprises a stereoscopic camera, wherein the sensor is attached to a lens assembly of at least one of a first camera or a second camera of the stereoscopic camera.

12. The system of claim 1, wherein the processor is further programmed to modify an image filter parameter of an image perception algorithm based on the image distortion prediction.

13. A method comprising:
receiving vehicle state data, vehicle inertial measurement data, and strain data indicative of displacement on an image capture assembly;
generating an image distortion prediction indicative of image distortion within an image captured by the image capture assembly based on the vehicle state data, the vehicle inertial measurement data, and the strain data;
at least one of correcting or mitigating image distortion within the image based on the image distortion prediction; and
determining whether to modify one or more vehicle actions, including at least a vehicle speed or a vehicle course, based on the image distortion prediction.

14. The method of claim 13, further comprising actuating the vehicle based on the image distortion prediction.

15. The method of claim 14, wherein the image distortion prediction includes at least one of a distortion type or a distortion magnitude.

16. The method of claim 15, wherein the at least one of the distortion type or the distortion magnitude comprises at least one of an image translation, an image rotation, or an image distortion error.

17. The method of claim 15, wherein the mitigating the image distortion based on the image distortion prediction includes accessing a lookup table based on the at least one of the distortion type or the distortion magnitude and applying an image correction technique corresponding to the at least one of the distortion type or the distortion magnitude.

* * * * *